(12) United States Patent
Stern et al.

(10) Patent No.: US 9,444,843 B2
(45) Date of Patent: Sep. 13, 2016

(54) MOBILE COMMUNICATION DEVICE AND METHOD OF OPERATING THEREOF

(71) Applicant: The Boeing Company, Seal Beach, CA (US)

(72) Inventors: Allon Joseph Stern, Leesburg, VA (US); John Richard Haley, Jr., Chantilly, VA (US)

(73) Assignee: The Boeing Company, Chicago, IL (US)

( * ) Notice: Subject to any disclaimer, the term of this patent is extended or adjusted under 35 U.S.C. 154(b) by 340 days.

(21) Appl. No.: 14/025,556

(22) Filed: Sep. 12, 2013

(65) Prior Publication Data

US 2015/0074745 A1   Mar. 12, 2015

(51) Int. Cl.
| | |
|---|---|
| *G06F 21/00* | (2013.01) |
| *H04L 29/06* | (2006.01) |
| *G06F 21/57* | (2013.01) |
| *G06F 9/44* | (2006.01) |

(52) U.S. Cl.
CPC ............. *H04L 63/20* (2013.01); *G06F 9/4401* (2013.01); *G06F 21/57* (2013.01)

(58) Field of Classification Search
CPC ....... H04L 63/20; G06F 21/57; G06F 9/4401
See application file for complete search history.

(56) References Cited

U.S. PATENT DOCUMENTS

| | | | |
|---|---|---|---|
| 5,320,554 A | 6/1994 | Freer et al. | |
| 5,778,304 A | 7/1998 | Grube et al. | |
| 6,516,205 B1 | 2/2003 | Oguma | |
| 6,636,750 B1 | 10/2003 | Zurek et al. | |
| 6,679,710 B2 | 1/2004 | Saito et al. | |
| 7,215,042 B2 | 5/2007 | Yan | |
| 7,454,625 B2 | 11/2008 | Fischer et al. | |
| 7,458,002 B2 | 11/2008 | Fischer et al. | |

(Continued)

FOREIGN PATENT DOCUMENTS

| | | |
|---|---|---|
| CN | 102853966 A | 10/2010 |
| CN | 102158599 A | 8/2011 |

(Continued)

OTHER PUBLICATIONS

McGill, Kathleen, "Trusted Mobile Devices: Requirements for a Mobile Trusted Platform Module" Johns Hopkins APL Technical Digest, vol. 32, No. 2 (2013), pp. 544-554.*

(Continued)

*Primary Examiner* — Michael Pyzocha
(74) *Attorney, Agent, or Firm* — Armstrong Teasdale LLP

(57) ABSTRACT

A mobile communication device is provided. The mobile communication device includes a first trusted platform module, a second trusted platform module, a processor, and a storage medium. The storage medium includes instructions that cause the processor to establish a root of trust for a first persona and a second persona, wherein the first persona includes a first operating system and a first trusted execution environment, and the second persona includes a second operating system and a second trusted execution environment. The instructions also cause the processor to store measurements defining the root of trust for the first persona in the first trusted platform module, store measurements defining the root of trust for the second persona in the second trusted platform module, and load the first persona and the second persona using the roots of trust for the first and second personas.

20 Claims, 8 Drawing Sheets

(56) References Cited

U.S. PATENT DOCUMENTS

| | | | |
|---|---|---|---|
| 7,715,559 B2 | 5/2010 | Rainbolt et al. | |
| 7,728,549 B2 | 6/2010 | Bartlett et al. | |
| 7,809,953 B2 | 10/2010 | Little et al. | |
| 7,865,917 B2 | 1/2011 | Hellman | |
| 8,060,074 B2 | 11/2011 | Danford et al. | |
| 8,176,214 B2 | 5/2012 | Jones et al. | |
| 8,220,029 B2* | 7/2012 | Zhang | G06F 21/53 713/164 |
| 8,224,170 B2 | 7/2012 | King et al. | |
| 8,397,306 B1* | 3/2013 | Tormasov | G06F 21/00 713/164 |
| 8,429,426 B2 | 4/2013 | Minz et al. | |
| 8,588,740 B2 | 11/2013 | Kim et al. | |
| 8,626,932 B2 | 1/2014 | Lydon et al. | |
| 8,874,916 B2* | 10/2014 | Smith | H04L 9/3265 380/284 |
| 9,256,506 B1 | 2/2016 | Taylor et al. | |
| 2003/0115447 A1 | 6/2003 | Pham et al. | |
| 2004/0204096 A1 | 10/2004 | Hirsch et al. | |
| 2005/0108531 A1 | 5/2005 | Swander et al. | |
| 2005/0177661 A1 | 8/2005 | Loo | |
| 2005/0246552 A1* | 11/2005 | Bade | G06F 21/53 713/193 |
| 2006/0230439 A1 | 10/2006 | Smith et al. | |
| 2006/0269065 A1 | 11/2006 | Lindteigen et al. | |
| 2006/0281480 A1 | 12/2006 | Klug et al. | |
| 2007/0180435 A1 | 8/2007 | Hunteler et al. | |
| 2007/0239979 A1* | 10/2007 | Berger | H04L 63/102 713/150 |
| 2007/0266256 A1* | 11/2007 | Shah | G06F 21/725 713/178 |
| 2008/0055276 A1 | 3/2008 | Chang | |
| 2008/0244261 A1* | 10/2008 | Wiseman | G06F 21/57 713/155 |
| 2008/0249643 A1 | 10/2008 | Nelson | |
| 2008/0290985 A1 | 11/2008 | Vogedes et al. | |
| 2009/0044187 A1* | 2/2009 | Smith | G06F 21/57 718/1 |
| 2009/0055641 A1* | 2/2009 | Smith | G06F 21/57 713/100 |
| 2009/0063694 A1 | 3/2009 | Foo et al. | |
| 2009/0091544 A1 | 4/2009 | Lindroos | |
| 2009/0169012 A1* | 7/2009 | Smith | G06F 21/57 380/277 |
| 2009/0179612 A1 | 7/2009 | Sherman et al. | |
| 2009/0181735 A1 | 7/2009 | Griffin, Jr. et al. | |
| 2009/0228639 A1 | 9/2009 | Cho | |
| 2010/0049895 A1 | 2/2010 | Liang | |
| 2010/0093401 A1 | 4/2010 | Moran et al. | |
| 2010/0106963 A1 | 4/2010 | Virtuoso et al. | |
| 2010/0161998 A1* | 6/2010 | Chen | G06F 21/57 713/189 |
| 2010/0269040 A1 | 10/2010 | Lee | |
| 2010/0277415 A1 | 11/2010 | Shanmugam et al. | |
| 2010/0325628 A1* | 12/2010 | Haga | G06F 21/575 718/1 |
| 2011/0055407 A1 | 3/2011 | Lydon et al. | |
| 2011/0076981 A1 | 3/2011 | Singh et al. | |
| 2011/0078361 A1* | 3/2011 | Chen | G06F 12/145 711/6 |
| 2011/0105081 A1 | 5/2011 | Park et al. | |
| 2011/0230178 A1 | 9/2011 | Jones et al. | |
| 2011/0255226 A1 | 10/2011 | Seil et al. | |
| 2011/0311043 A1 | 12/2011 | Sibert et al. | |
| 2012/0066422 A1 | 3/2012 | Monks | |
| 2012/0117609 A1 | 5/2012 | Dalzell et al. | |
| 2012/0297175 A1* | 11/2012 | Ekberg | G06F 21/575 713/1 |
| 2013/0036377 A1 | 2/2013 | Colley | |
| 2013/0095888 A1 | 4/2013 | Chapman | |
| 2013/0260722 A1 | 10/2013 | Pi | |
| 2014/0007087 A1* | 1/2014 | Scott-Nash | G06F 21/53 718/1 |
| 2014/0073375 A1 | 3/2014 | Li et al. | |
| 2014/0165155 A1 | 6/2014 | Zhang | |
| 2014/0208097 A1 | 7/2014 | Brandwine et al. | |
| 2014/0258733 A1* | 9/2014 | Scott-Nash | G06F 12/1408 713/190 |

FOREIGN PATENT DOCUMENTS

| | | |
|---|---|---|
| DE | 20009217 U1 | 8/2000 |
| EP | 2230605 A1 | 9/2010 |
| EP | 2261832 A1 | 12/2010 |
| WO | 2013022849 A1 | 2/2013 |
| WO | 2013061156 A2 | 5/2013 |

OTHER PUBLICATIONS

Chen, Lily et al., "Guidelines on Hardware-Rooted Security in Mobile Devices (Draft)", NIST Special Publication 800-164 (Draft), Oct. 2012, 33 total pages.*

Chang, Dexian et al., "TSD: A Flexible Root of Trust for the Cloud", 2012 IEEE 11th International Conference on Trust, Security and Privacy in Computing and Communications, pp. 119-126.*

CN First Office Action for related application 201280050423.3 dated Feb. 6, 2015; 20 pp.

International Search Report and Written Opinion of International Application No. PCT12012/054672 dated Dec. 11, 2012; 12 pp.

EP10 Specifications; Model No. 7515; Model Name EP10; Psion PLC 2011; 3 pp.

International Search Report and Written Opinion of International Application No. PCT/US2014/045017; dated Oct. 17, 2014, 10 pp.

Ruan, Anbang et al.; A Generalized Trusted Virtualized Platform Architecture; Young Computer Scientists; The 9th International Conference for IEEE; Piscataway, NJ, USA; Nov. 18, 2008; pp. 2340-2346; ISBN: 978-0-7695-3998-8.

Berger, Stefan et al.; vTPM: Virtualizing the Trusted Platform Module; USENIX Association; Security 2006: 15th USENIX Security Symposium, Aug. 2, 2006, pp. 305-320; XP061011058 downloaded by EPO on Apr. 11, 2013.

International Search Report and Written Opinion of International Application No. PCT/US2014/045022; Oct. 20, 2014; 10 pages.

International Search Report and Written Opinion of International Application No. PCT/US2014/045042; Oct. 27, 2014; 8 pages.

* cited by examiner

MOBILE COMMUNICATION DEVICE AND METHOD OF OPERATING THEREOF

BACKGROUND

The field of the present disclosure relates generally to mobile communication devices and, more specifically, to a mobile communication device that enables trusted operation of one or more isolated, virtualized operating systems running thereon.

Mobile communication devices, such as smartphones, cellular phones, and personal digital assistants (PDAs) have grown in use and popularity among a variety of different types of users. At least some known devices include a central processing unit (CPU) that may be virtualized to simultaneously execute multiple operating systems (OSs) on one device. For example, a software program known as a hypervisor may be used to separate the different OSs by managing input/output (I/O) access operations transmitted between the OSs and hardware devices included in the computer system. More specifically, the hypervisor facilitates separating underlying hardware, such as the CPU and associated peripherals (e.g., display devices, touchscreens, and communications interfaces), from the OSs that run on the hardware.

While device virtualization may facilitate separating one set of software from another set of software on known computing devices, the underlying platform may be susceptible to a variety of security vulnerabilities. Because of this, it has become increasingly important to those in the computer industry to increase the security of known computing devices. As such, it may be desirable to incorporate enhanced security into a device virtualization architecture.

BRIEF DESCRIPTION

In one aspect, a mobile communication device is provided. The mobile communication device includes a first trusted platform module, a second trusted platform module, a processor, and a storage medium. The storage medium includes instructions that cause the processor to establish a root of trust for a first persona and a second persona, wherein the first persona includes a first operating system and a first trusted execution environment, and the second persona includes a second operating system and a second trusted execution environment. The instructions also cause the processor to store measurements defining the root of trust for the first persona in the first trusted platform module, store measurements defining the root of trust for the second persona in the second trusted platform module, and load the first persona and the second persona using the roots of trust for the first and second personas.

In another aspect, a method of operating a mobile communication device is provided. The method includes establishing a root of trust for a first persona and a second persona, wherein the first persona includes a first operating system and a first trusted execution environment and the second persona includes a second operating system and a second trusted execution environment. The method also includes storing measurements defining the root of trust for the first persona in the first trusted platform module, storing measurements defining the root of trust for the second persona in the second trusted platform module, and loading the first persona and the second persona using the roots of trust for the first and second personas.

In yet another aspect, a non-transitory computer readable medium storing computer-executable instructions thereon for operating a mobile communication device is provided. The mobile communication device includes a processor, a first trusted platform module, and a second trusted platform module. The computer-executable instructions cause the processor to establish a root of trust for a first persona and a second persona, wherein the first persona includes a first operating system and a first trusted execution environment and the second persona includes a second operating system and a second trusted execution environment. The computer-executable instructions also cause the processor to store measurements defining the root of trust for the first persona in the first trusted platform module, store measurements defining the root of trust for the second persona in the second trusted platform module, and load the first persona and the second persona using the roots of trust for the first and second personas.

DETAILED DESCRIPTION

The systems and methods described herein that may be used to operate a mobile communication device. In the exemplary implementation, the mobile communication device is managed by a hardware and software architecture that uses cryptography, such as cryptography based on public and private keys, to facilitate securing operating systems running thereon. More specifically, the mobile communication device supports multiple virtualized operating systems that run simultaneously on the device and that each have separate roots of trust. As such, the virtualized operating systems' access to hardware on the device is enforced by predetermined security policies to enable trusted operation of the device.

Figure 1:
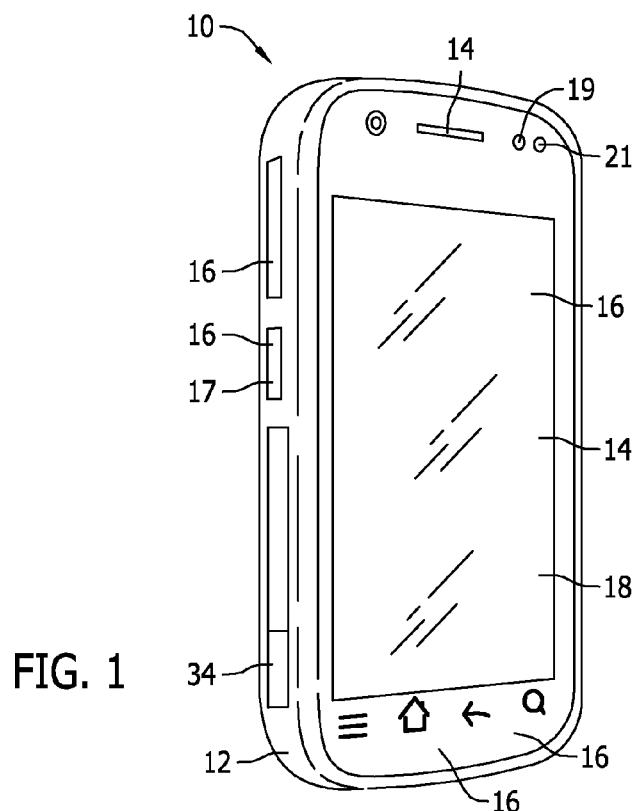
FIG. 1 is a front perspective view of an exemplary mobile communication device.
Figure 2:
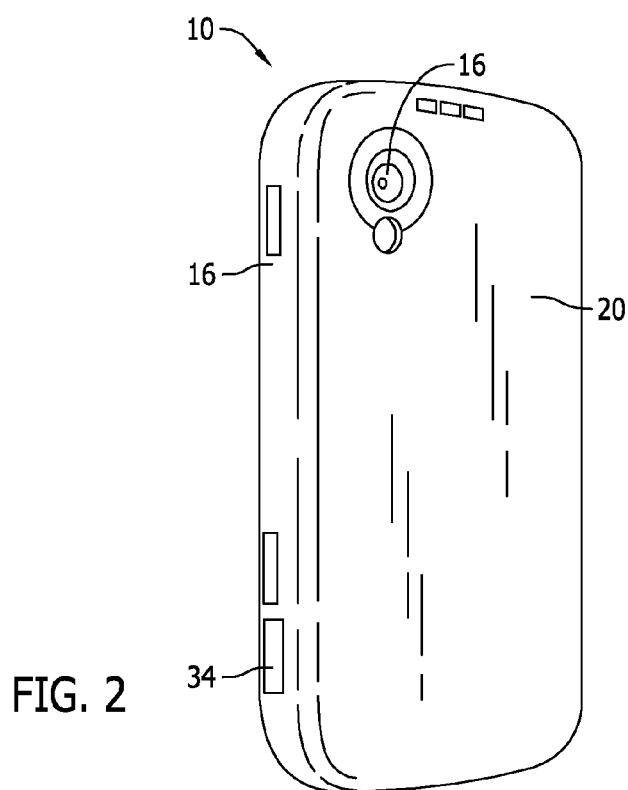
FIG. 2 is a back perspective view of the mobile communication device shown in FIG. 1.

FIGS. 1 and 2 illustrate an exemplary mobile communication device 10. In the exemplary implementation, mobile communication device 10 is provided for supporting voice communication with another device, such as another mobile communication device. Moreover, mobile communication device 10 may include a variety of other functionalities, including network access, SMS messaging, hosting of one or more applications, data processing, encryption, and/or other functions. Mobile communication device 10 may be a smartphone, configured to communicate through one or more cellular networks. In an alternative implementation, mobile communication device 10 may operate exclusively over a non-cellular network such as a WiFi and/or satellite network.

As shown, mobile communication device 10 includes a housing 12 and multiple presentation devices 14 disposed at least partially within housing 12. Presentation device 14 outputs information such as, but not limited to, data related to operation of mobile communication device 10, commands, requested data, messages, one or more input devices (such as, a virtual keyboard), and/or any other type of data to a user. In several examples, presentation device 14 may include, for example, a liquid crystal display (LCD), a light-emitting diode (LED) display, a light-emitting diode (LED), a camera flash, an organic LED (OLED) display, and/or an "electronic ink" display. In some implementations, multiple presentation devices 14 may be included to present data to a user visually and/or audibly. In the exemplary implementation, presentation device 14 includes an audio output for use in voice communication.

Mobile communication device 10 further includes multiple input devices 16 disposed at least partially within housing 12. Each input device 16 may be configured to receive selections, requests, commands, information, data, and/or any other type of inputs, according to one or more of the methods and/or processes described herein. Input devices 16 may include, for example, buttons, a keyboard, a microphone, a vibe, a pointing device, a stylus, a touch sensitive panel (e.g., a touch pad or a touch screen), a gyroscope, an accelerometer, a digital compass, a position detector, a camera, a second camera, an ambient light sensor, and/or an audio input interface. In the exemplary implementation, a single component, such as a touch screen 18, functions as both presentation device 14 and input device 16.

In one implementation, mobile communication device 10 includes security features that facilitate secure operation of mobile communication device 10. Security features include an input device 16 such as a security button 17 and a presentation device 14 such as a plurality of LEDs. More specifically, mobile communication device 10 includes a first LED 19 and a second LED 21. As will be described in more detail below, the security features may be used to change and/or verify an operational, trusted status of mobile communication device 10. In an alternative implementation, mobile communication device 10 may include any type and/or number of presentation devices that enable the security features to function as described herein.

Mobile communication device 10 includes back panel 20 engaged with housing 12. Back panel 20 defines a cross-section substantially consistent with housing 12, thereby forming a substantially integral unit with housing 12 when coupled thereto. Back panel 20 is removable from mobile communication device 10 to provide access to one or more aspects of mobile communication device 10.

Figure 3:
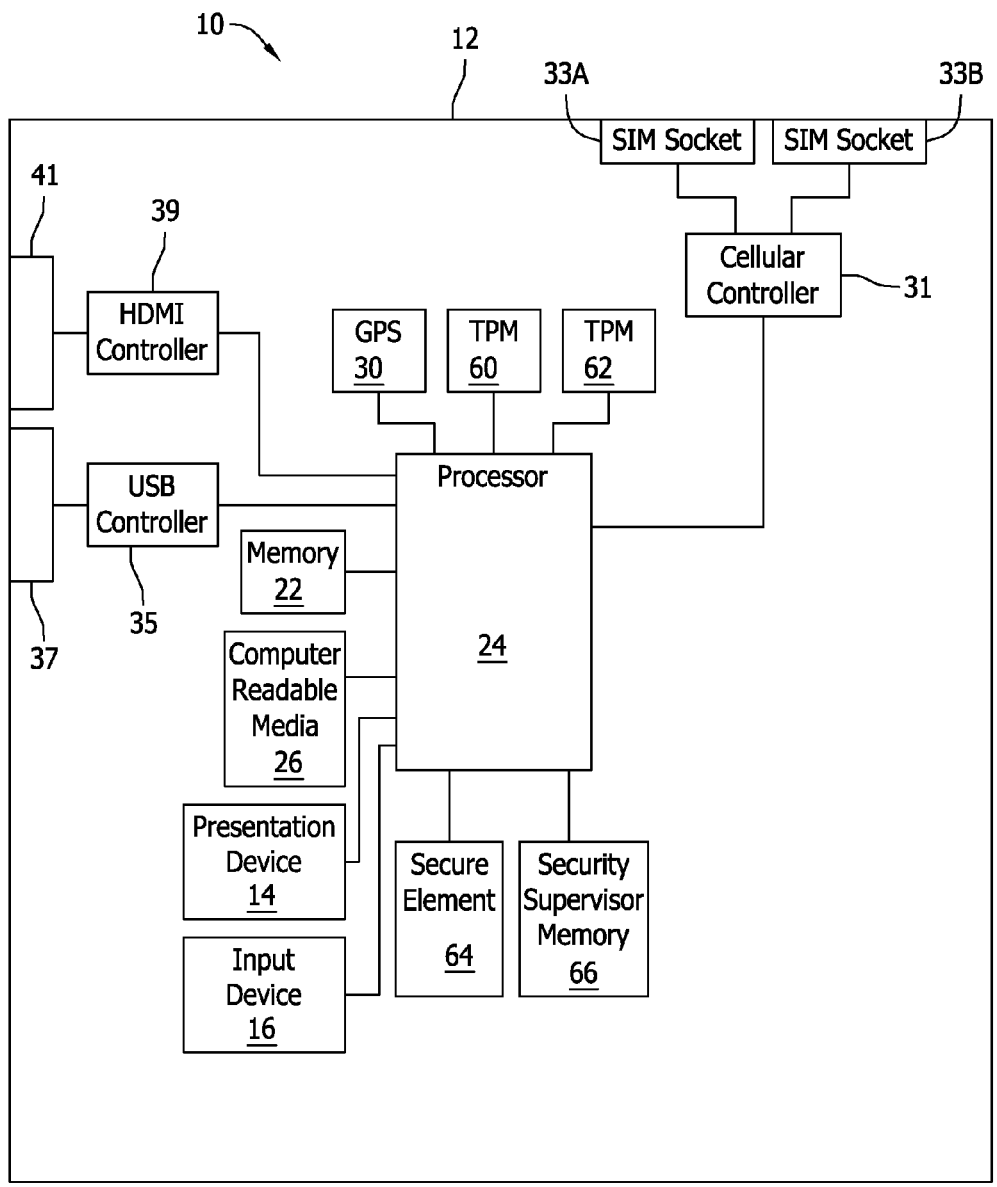
FIG. 3 is a schematic illustration of an exemplary hardware architecture that may be used with the mobile communication device shown in FIG. 1.

FIG. 3 is a schematic illustration of an exemplary hardware architecture that may be used with mobile communication device 10 (shown in FIG. 1). In the exemplary implementation, mobile communication device 10 includes a memory 22 and a processor 24 coupled to memory 22 for executing programmed instructions. Processor 24 may include one or more processing units (e.g., in a multi-core configuration) and/or include a cryptographic accelerator (not shown). Mobile communication device 10 is programmable to perform one or more operations described herein by programming memory 22 and/or processor 24. For example, processor 24 may be programmed by encoding an operation as executable instructions and providing the executable instructions in memory 22.

Processor 24 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 24, cause processor 24 to perform at least a portion of the functions described herein. The above examples are exemplary only, and thus are not intended to limit in any way the definition and/or meaning of the term processor.

Memory 22, as described herein, is one or more devices that enable information such as executable instructions and/or other data to be stored and retrieved. Memory 22 may include one or more computer-readable media, such as, without limitation, dynamic random access memory (DRAM), synchronous dynamic random access memory (SDRAM), static random access memory (SRAM), a solid state disk, and/or a hard disk. Memory 22 may be configured to store, without limitation, executable instructions, operating systems, applications, resources, installation scripts and/or any other type of data suitable for use with the methods and systems described herein.

Instructions for operating systems and applications are located in a functional form on non-transitory memory 22 for execution by processor 24 to perform one or more of the processes described herein. These instructions in the different implementations may be embodied on different physical or tangible computer-readable media, such as memory 22 or another memory, such as a computer-readable media 26, which may include, without limitation, a flash drive and/or thumb drive. Further, instructions are located in a functional form on non-transitory computer-readable media 26, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. Computer-readable media 26 may be selectively insertable and/or removable from mobile communication device 10 to permit access and/or execution by processor 24. In some implementations, computer-readable media 26 is not removable.

Referring again to FIG. 3, mobile communication device 10 may include a GPS component 30, which is configured to provide location data to processor 24. The location data permits processor 24 to determine the location of mobile communication device 10 and/or provide functionality dependent on the location of mobile communication device 10, such as, for example, navigation functionality. In an alternative implementation, location data may be obtained for mobile communication device 10 using a cellular network, by identifying nearby 802.11 and/or Bluetooth base stations or devices, and/or a combination thereof.

In some implementations, mobile communication device 10 further includes at least one crypto-processor. More specifically, mobile communication device 10 includes a first trusted platform module (TPM) 60 and a second TPM 62. The TPMs encrypt at least a portion of data accessed by processor 24 for communication to/from mobile communication device 10 and/or for storage therein. Accordingly, some data may be segregated from other applications and/or operations of the mobile communication device 10, and kept at a higher level of security than such applications/operations. As such, TPMs 60 and 62 facilitate enabling trusted boot, measured boot, secure boot, remote attestation, and protected keystore, for example.

Further, mobile communication device includes a secure element 64 coupled to processor 24. More specifically, secure element 64 may be integrated with mobile communication device 10 as at least one of a Universal Integrated Circuit Card (UICC), a microSD card, and/or embedded within mobile communication device 10. Secure element 64 is a tamper-resistant, storage and execution environment that may be used as a keystore device and/or as hardware trust anchor for a platform running on mobile communication device 10. More specifically, secure element 64 stores data encryption keys, passwords, and hardware and software configuration information. Further, secure element 64 generates public key pairs and facilitates restricting export of associated private keys. In an alternative implementation, secure element 64 may be implemented with a TPM.

Mobile communication device 10 also includes a security supervisor memory 66. Security supervisor memory 66 stores tamper-reactive data that may include a plurality of keys, and may be used to wrap data within secure element 64 and/or first TPM 60 or second TPM 62. In operation, the tamper-reactive data may be cleared such that the wrapped data cannot be recovered upon detection of a tamper event. Security supervisor memory 66 may hold any amount of tamper-reactive data that enables mobile communication device 10 to function as described herein.

Mobile communication device 10 further includes a cellular controller 31 coupled to processor 24. Cellular controller 31 permits mobile communication device 10 to communicate with one or more cellular network (not shown) to provide voice and/or data communication with the cellular network. In this example, mobile communication device 10 includes two subscriber identity module (SIM) card sockets 33A and 33B coupled to cellular controller 31. In this manner, mobile communication device 10 is capable of receiving two SIM cards associated with two different cellular accounts, selectable by a user of mobile communication device 10. For example, mobile communication device 10 may access a personal cellular account and a business cellular account, allowing the user to select therebetween to separate personal usage and business usage. It should be appreciated that a different number of SIM card sockets may be included in other implementations.

Further, mobile communication device 10 includes a USB controller 35 coupled to processor 24. As shown in FIG. 3, USB controller 35 is accessible through connector 37. In this manner, one or more different devices may communicate with mobile communication device 10. Similarly, mobile communication device 10 further includes a high-definition multimedia interface (HDMI) controller 39 coupled to processor 24 and accessible through a connector 41. In at least one implementation, connectors 37 and/or 41 may provide micro-USB and/or micro-HDMI connections to mobile communication device 10.

Additionally, or alternatively, mobile communication device 10 may include one or more of a Bluetooth controller, a ZigBee controller, and/or a Wi-Fi controller to provide one or more wireless communication channels. While GPS component 30, first TPM 60, second TPM 62, and cellular controller 31 are provided at least partially in hardware, it should be further appreciated that one or more components integrated into mobile communication device 10 may be provided through software and/or firmware associated with processor 24. In one example, processor 24 provides an air interface firewall, configured to analyze low-level air interface protocols of mobile communication device 10 and permit or deny network transmissions based on approved network identities and characteristics. In this example, air interface protocol data from cellular controller 31 containing cellular network identities and characteristics is provided to processor 24 and analyzed by processor 24 to determine if mobile communication device 10 should be permitted to conduct network transmissions via cellular networks identified by cellular controller 31. In this example, the level of analysis provided adds network security to mobile communication device 10 by having processor 24 further authenticate the network connections of cellular controller 31 beyond using standard cellular network protocol authentication mechanisms of cellular controller 31 by themselves. It should be noted that other air interface components of mobile communication device 10, such as, for example a Bluetooth controller and/or a Wi-Fi controller, may also be monitored by the air interface firewall. In an alternative implementation, first TPM 60 and second TPM 62 may be implemented in software.

It should be appreciated that other mobile communication device implementations may include more or fewer components integrated with or external to processor 24.

Figure 4:
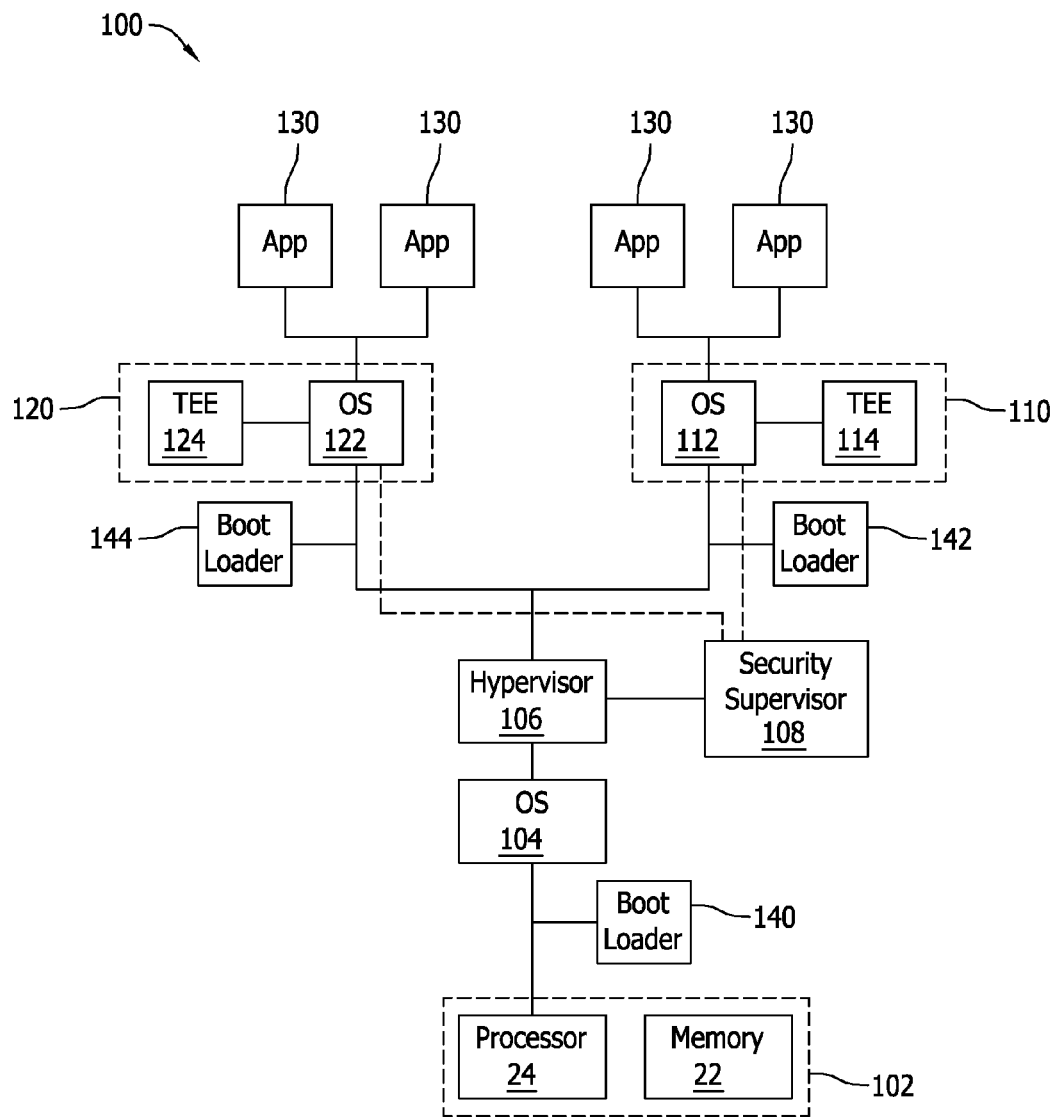
FIG. 4 is a schematic illustration of an exemplary software architecture that may be used with the mobile communication device shown in FIG. 1.

FIG. 4 is a schematic illustration of an exemplary software architecture 100 that may be used with mobile communication device 10 (shown in FIG. 1). In the exemplary implementation, software architecture 100 includes an operating system 104 installed on a hardware platform 102 that includes processor 24 and memory 22. Hardware platform 102 includes the components of mobile communication device 10 described above. Software architecture 100 also includes a virtualization software layer, such as a hypervisor 106, that runs on top of operating system 104 (i.e., a type 2 hypervisor) and a security supervisor 108 coupled in communication with hypervisor 106. In an alternative implementation, hypervisor 106 may be installed and operate on hardware platform 102 (i.e., a type 1 hypervisor). Hypervisor 106 supports a plurality of virtual machine execution spaces such that a plurality of virtual machines may be concurrently instantiated and executed.

Hypervisor 106 virtualizes a first persona 110 and a second persona 120 that may be executed and run on top of hypervisor 106. First persona 110 includes a first persona operating system (OS) 112 and a first trusted execution environment (TEE) 114, and second persona 120 includes a second persona operating system 122 and a second trusted execution environment 124.

First persona 110 and second persona 120 each have a defined trust anchor that may be used to validate trust and authorize actions performed by each persona. More specifically, first persona 110 has a first trust anchor and second persona 120 has a second trust anchor that is separate from the first trust anchor. As used herein, the term "trust anchor" refers to one or more secret encryption keys (i.e., a cryptographic certificate) that defines the owner of the persona and that may be used to sign persona assets. Conversely, as used herein, the terms "owner" and/or "ownership" refer to a person or entity that has administrative control over a persona by holding the trust anchor. In some implementations, the trust anchor root certificate may be used to sign an intermediate certificate authority that signs the assets of the persona package.

Each trust anchor traces back to a root certificate authority, which may be an enterprise organization and/or may be defined in a lightweight manner for a single user on a desktop computer. As such, the resources of first persona 110 may be kept separate from second persona 120, and access policies that have been agreed to and signed by each trust anchor may be enforced. The root certificate authority may be stored offline and in a secure location. Further, the trust anchor may include a plurality of intermediate certificate authorities having specifically defined capabilities. Exemplary capabilities include, but are not limited to, the right to define an operating system, the right to define a TEE, the right to define security policies, the right to define other intermediate certificate authorities and/or user certificates, backup capabilities, backup policy, the ability to update an operating system, the ability to update a TEE, mobile device management (MDM) functionality, and key import and/or export.

The trusted software of first persona 110 and second persona 120 each run in a context that is isolated from the other under default conditions. More specifically, as described above, hypervisor 106 facilitates separating and isolating first TEE 114 and second TEE 124 from each other. As such, each persona will not be affected by other operating systems running on mobile communication device 10. Further, first persona 110 and second persona 120 may be configured to establish mutual trust between first TEE 114 and second TEE 124. Establishing such mutual trust enables a trusted communication pathway to be formed between first persona 110 and second persona 120. Communication between first TEE 114 and second TEE 124 may only be allowed by mutual agreement in the security policies of first persona 110 and second persona 120. Further, a high assurance guard (not shown) may be implemented to facilitate restricting a flow of data between first persona 110 and second persona 120. For example, the high assurance guard may facilitate restricting the flow of sensitive and/or classified data between first persona 110 and second persona 120, while allowing the flow of unclassified data therebetween.

While first persona 110 and the elements thereof will be described in further detail below, it should be understood that the same description may apply to second persona 120 and the elements thereof. In the exemplary implementation, first persona OS 112 is an execution environment having resources and virtual device drivers that enable running a full operating system. An exemplary full operating system may include, but is not limited to, an Android® Open Source Project (AOSP) operating system. First persona OS 112 may include a library that enables first persona OS 112 to communicate with first TEE 114. Further, a plurality of applications 130 may be acquired from an external source (not shown) and run on top of first persona OS 112.

First TEE 114 is a lightweight execution environment that is separate from and coupled in communication with first persona OS 112. First TEE 114 is a secure environment that provides an area that may be used to store sensitive data and to run sensitive applications. In alternative implementations, first TEE 114 may be an execution environment having resources and virtual device drivers that enable running a full operating system and/or may be run on a separate piece of hardware. Further, first persona 110 may include more than one trusted execution environment.

First TEE 114 has direct access to an ISO7816 subscriber identification module (SIM) interface and/or a TPM. More specifically, first TPM 60 (shown in FIG. 3) is assigned to first persona 110, and second TPM 62 (shown in FIG. 3) is assigned to second persona 120. As such, first TPM 60 may be used as a hardware trust anchor for an owner of first persona 110, and second TPM 62 may be used as a hardware trust anchor for an owner of second persona 120. Further, first TEE 114 has direct access to first TPM 60 and to trusted execution environment services such as authentication, keystore access, virtual private network (VPN) configuration, and/or voice over internet protocol (VoIP) software, for example. Isolating such sensitive data pathways within first TEE 114 and away from first persona OS 112 facilitates ensuring trusted operation of mobile communication device 10 while maintaining control of the TEE services with the persona owner. Further, allowing first TEE 114 to control first TPM 60 facilitates isolating sensitive information from first persona OS 112 such that the information is in a more secure and protected environment.

Further, first TEE 114 may have access to cryptographic services such that cryptographic operations may be performed on behalf of first persona OS 112 without exposing it to a plaintext key. More specifically, first TEE 114 may use encryption modules in first TPM 60 that enable uncertified hardware accelerated cryptography, suite B, and/or FIPS-140-2 certified encryption. Mobile communication device 10 may also include a VPN module and/or a VoIP module. The VPN module enables first persona 110 to authenticate a VPN and communicate with encryption without authentication or encryption keys being visible to untrusted code. Additionally, the VoIP module enables first persona 110 to establish and authenticate a VoIP call and communicate with encryption without authentication or encryption keys being visible to untrusted code.

The trust of first persona OS 112 and second persona OS 122 is defined by the integrity of a boot image of each persona loaded by platform hardware 102. For example, the trust of first TEE 114 is defined by the integrity of its static image when loaded by platform hardware 102 as will be described in more detail below. More specifically, the code loaded into first TEE 114 is validated against a trust anchor during loading, and the image is immutable once it is loaded. Because the image is immutable, first TEE 114 may only be changed by loading a new signed image over first TEE 114. Further, first persona OS 112 and second persona OS 122 may use resources outside of their own execution environment to manage their integrity. For example, the loading of the operating systems may be encrypted and validated, and the operating systems' access to hardware resources may be limited and enforced through configurations outside of their control.

Software architecture 100 also includes a primary boot loader 140 that loads operating system 104, a first secondary boot loader 142 that loads first persona OS 112, and a second secondary boot loader 144 that loads second persona OS 122. In the exemplary implementation, mobile communication device 10 uses a processor that facilitates establishing platform trust during the boot process. More specifically, the processor enables signature validation of the boot loaders to facilitate establishing trust during loading of each operating system. For example, mobile communication device 10 uses a combination of fixed hash values and signature validation such that a chain of trust remains unbroken as it extends from hardware platform 102 to first persona 110 and second persona 120.

In operation, processor 24 loads primary boot loader 140 if it is digitally signed by a device manufacturer's root of trust. As used herein, the term "device manufacturer root of trust" refers to one or more secret encryption keys (i.e., a cryptographic certificate) used by a device manufacturer to sign assets that come installed on mobile communication device 10. The chain of trust continues unbroken through hypervisor 106 to facilitate establishing isolated execution environments, validating components within mobile communication device 10, and/or storing measurements in the trusted platform modules for later use by the user code to bind against the trusted state.

Control of first TPM 60 is transferred to first persona 110, and control of second TPM 62 is transferred to second persona 120 such that the measured boot aspects of TPMs 60 and 62 may be used by first persona 110 and second persona 120. More specifically, TPMs 60 and 62 are initialized by the trusted boot software of mobile communication device 10, and control is then transferred to each persona for their exclusive use after the personas have been loaded. If a persona uses a TPM for trusted boot, then hardware and/or software changes may result in the inability to retrieve keys that have been bound against the original configurations such that the persona may not be rebooted without resetting the entire device.

During the boot process, the TPMs measure (i.e., hash) the critical software and firmware components used within mobile communication device 10. For example, a root of trust for measurement may be established when the measurements for primary boot loader 140, operating system 104, hypervisor 106, security supervisor 108, boot loader 142, and first persona OS 112 are extended into first TPM 60. The measurements may be stored within platform configuration registers (PCRs) located in first TPM 60 and may be used to validate an operating system's image against an associated trust anchor at boot time. As such, the integrity of the system may be verified before allowing access to sensitive information that may be bound to the PCRs.

The personas may be responsible for their own integrity once control is transitioned from the device manufacturer trust during boot loading. For example, it is the responsibility of first persona OS 112 to validate applications 130 that are installed and run on first persona OS 112. As such, in the event that a rogue application (not shown) compromises the integrity of a guest operating system running on mobile communication device 10, the compromise will not affect the integrity of the other guest operating systems if they do not have a trust relationship with the compromised operating system.

Security supervisor 108 is coupled in communication with first and second persona OSs 112 and 122. Security supervisor 108 is an operating system that facilitates storing and executing security policies for use in operation of mobile communication device 10. Security supervisor 108 runs in an isolated environment and may have access to platform resources, additional interfaces, and/or additional capabilities. In some implementations, first persona 110 and second persona 120 are separated through a trusted mechanism (i.e., CPU virtualization) such that a persona owner cannot configure a security policy of a persona that is not owned by that persona owner. For example, the security policy of first persona 110 may only be configured by a first persona owner, and the security policy of second persona 120 may only be configured by a second persona owner. More specifically, each security policy may be signed by the private key of the persona owner and the signature may be validated by mobile communication device 10 using a corresponding public key of the persona owner before security supervisor 108 applies to security policy to the associated persona. Ownership and security policies for first persona 110 and second persona 120 are stored in a configuration file that may be maintained by security supervisor 108. Further, the ownership and security policies are validated by cryptographic certificates. As such, each persona owner may define the operating system, trusted execution environment, and security policy for the persona that it owns.

The security policies of first persona 110 and second persona 120 may be defined by the persona owners, and may be defined, stored, and enforced in isolation from the persona code. The security policies define how each associated persona may access physical devices on mobile communication device 10. For example, the security policies restrict access of a persona to one or more physical devices, define guidelines for exclusive access of a persona to one or more physical devices, and/or define guidelines for shared device access for first persona 110 and second persona 120. More specifically, the guidelines for access to a shared device may enable sharing the device such that only the persona in control of a user interface has access to the shared device. Further, the specified rules in one or more security policies for access to a shared device may enable sharing the device such that a persona running in the background may still have access to the shared device. As such, the rules defined by the security policies enable the persona owners to tailor mobile communication device 10 in a variety of configurations to suit their needs.

The baseline image and/or the filesystems of first persona 110 may be encrypted and stored on internal and/or removable media. Further, the boot volume of first persona 110 may be encrypted such that pre-boot authentication from the trusted boot process may be required before first persona 110 can boot and access sensitive data stored thereon. More specifically, during the trusted boot process, a user may be prompted to enter credentials before first persona 110 is allowed to boot. The user may want to verify a status of mobile communication device 10 before entering his/her credentials. For example, the user may request verification that mobile communication device 10 is in a trusted state before entering a password and/or personal identification number (PIN) to ensure that the entry screen is authentic. As described above, mobile communication device 10 includes security features such as security button 17 and/or LEDs 19 and 21 (shown in FIG. 1). The security features are isolated in hardware that is inaccessible from untrusted code running on mobile communication device 10 to facilitate verifying that the entry screen is authentic.

In operation, a user may actuate security button 17 when an authentication dialogue appears on touch screen 18 (shown in FIG. 1). Actuating security button 17 displays root of trust information for mobile communication device 10 and/or displays root of trust information for the software requesting the authentication dialogue to appear. For example, the root of trust information may include root of trust information for mobile communication device 10 and/or for a persona running on mobile communication device 10. As such, the user may verify the root of trust information and safely enter the requested credentials. In an alternative implementation, the authentication dialogue may be verified when LEDs 19 and 21 are activated in a predetermined configuration.

In one implementation, the user may desire changing an operational status of mobile communication device. More specifically, the user may desire transitioning a focus of mobile communication device 10 between personas running on mobile communication device 10. For example, actuating security button 17 facilitates transitioning focus between first persona 110 and second persona 120. Moreover, first LED 19 is assigned to first persona 110, and second LED 21 is assigned to second persona 120. First LED 19 may be activated and second LED 21 may be deactivated when first persona 110 is in focus, and second LED 21 may be activated and first LED 19 may be deactivated when second persona 120 is in focus. As such, first LED 19 and second LED 21 provide visual feedback to the user based on the operational status of mobile communication device 10.

At least one of TPMs 60 and 62 have a physical presence feature that prompts a user to verify its presence relative to mobile communication device 10. For example, the physical presence feature may be implemented to verify that an operation being run on mobile communication device 10 is not being performed remotely. As such, the security button 17 may be pressed to verify the physical presence of the user.

Figure 5:
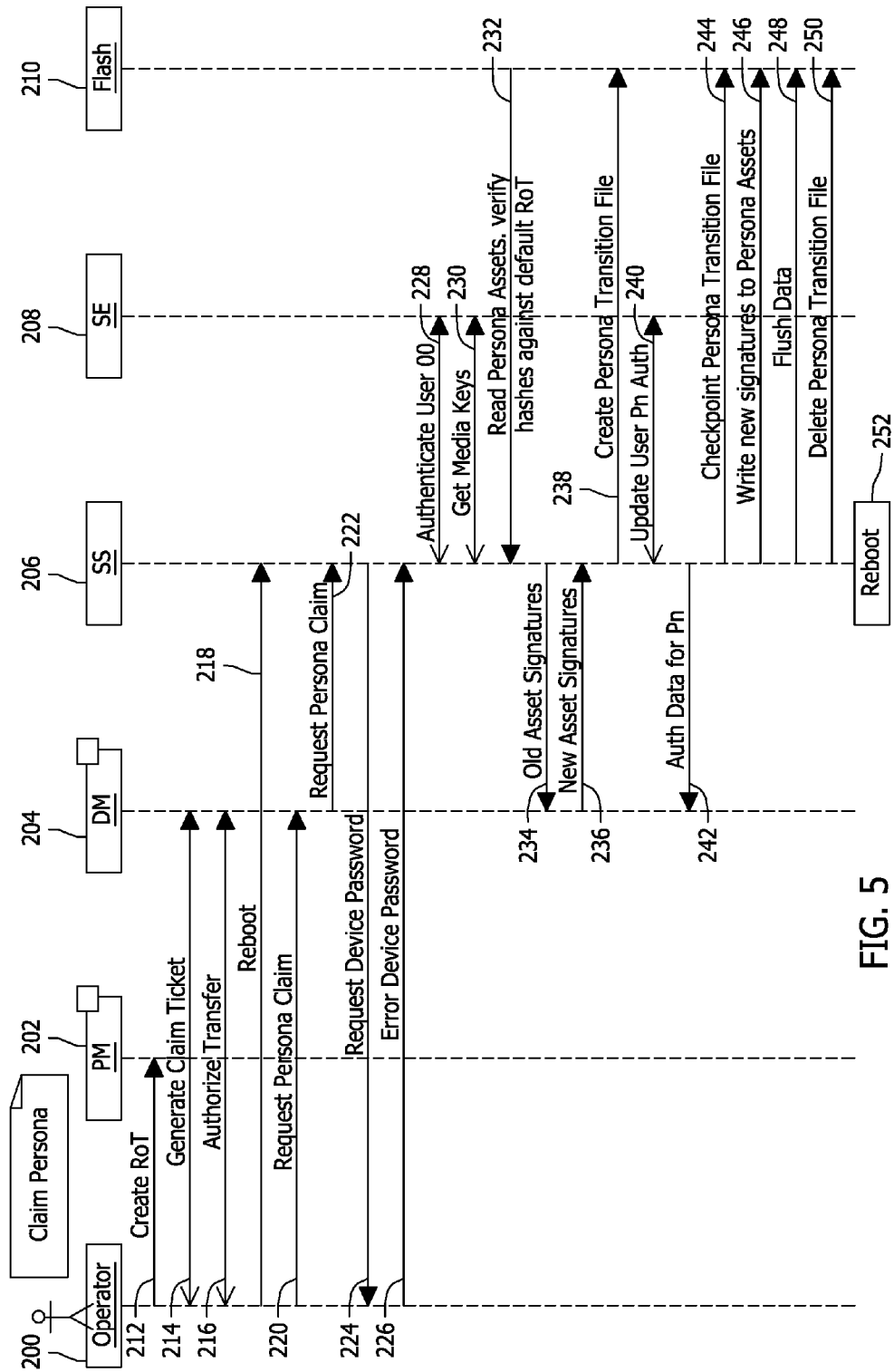
FIG. 5 is a flow diagram of an exemplary method of claiming ownership of a persona that may be used with the mobile communication device shown in FIG. 1.

FIG. 5 is a flow diagram of an exemplary method of claiming ownership of a persona that may be used with mobile communication device 10. In the exemplary implementation, mobile communication device 10 uses cryptographic roots of trust to define ownership of first persona 110 and second persona 120. For example, first persona 110 may be configured for use by one entity, and second persona 120 may be configured for use by another entity. An issuer (i.e., an enterprise) of mobile communication device 10 may issue one or more mobile communication devices 10 to a user (e.g., a customer and/or an employee). In such an implementation, first persona 110 may be configured for business use and second persona 120 may be configured for personal use. In an alternative implementation, mobile communication device 10 may be configured to separate the personas by assigning separate SIMs, separate services, and/or by isolating data, the operating systems, and cellular communications of first persona 110 and second persona 120.

Using cryptographic roots of trust enables mobile communication device 10 to verify the integrity of a persona configuration, and limit modification rights of the persona to authorized parties. For example, mobile communication device 10 may be provided to an end user with at least one default persona (i.e., a persona without defined ownership) installed thereon. The default persona is signed by a default trust anchor by the manufacturer, which indicates that the persona is unmodified and has a default policy assigned thereto. The end user can then use the default persona, but cannot customize it without first taking ownership by defining a root of trust.

An operator 200 claims ownership of a persona, such as second persona 120, by creating 212 a root of trust for the persona on a workstation of a Persona Manager (PM) 202. In some implementations, PM 202 may also enable operator 200 to edit and/or define the security policy for the persona, and/or update the images of the persona and/or a trusted execution environment, such as second TEE 124. Operator 200 requests that a Device Manager (DM) 204 generate 214 a claim ticket to claim an operating system, such as second persona OS 122, to transfer ownership from the default trust anchor to the created 212 root of trust. The transfer is then authorized 216 and mobile communication device 10 is rebooted 218.

During reboot 218, operator 200 couples a Universal Serial Bus (USB) cable between DM 204 and mobile communication device 10, and mobile communication device 10 detects the USB connection and enters a programming mode such that the persona operating systems do not load. Operator 200 then requests 220, from the workstation, that DM 204 run software to transfer the persona to the new owner. The request is directed 222 towards security supervisor 206 and may define a new persona trust anchor. Security supervisor 206 then uses generated 214 claim ticket to request 224 authorization from operator 200 to verify its identity, and operator 200 enters 226 a predetermined device password in response to authorization request 224. Request 224 may also be signed by the created 212 root of trust.

Mobile communication device 10 then presents an authentication request 228 from security supervisor 206 to a user to enter their credentials to unlock secure element 208. If the persona is confirmed as being ownerless by the default trust anchor, the old persona asset hashes and signatures are transferred 234 to DM 204. DM 204 verifies the signatures and re-signs the hashes with the new persona signing key that is authorized to sign the relevant assets. Further, the persona key that allows access to the persona media keys is changed. Replacement signatures are then transferred 236 from DM 204 to mobile communication device 10, and mobile communication device 10 validates the signatures and replaces the old signatures on the persona assets with the new signatures.

A persona transition file is then created 238, and the configuration file for the persona is checked for validity and conflicts with other configuration files that are already on mobile communication device 10. The process proceeds if the configuration file is validated, and the software update stops if there is a conflict between configuration files. The user persona authentication is updated 240 upon authorization to proceed such that media keys may be accessed by the new root of trust and returned 242 to DM 204.

DM 204 signs the assets that are being updated and returns the signed hashes. For example, assets that are being updated may either have signatures that are updated with re-signed hashes and/or may be updated 246 with new signatures. The persona transition file is checkpointed 244 after each update to enable the process to be restarted from an interrupted update. After the update is complete, buffer data is flushed 248 to flash 210, the persona transition file is deleted 250, and mobile communication device 10 is rebooted 252.

Figure 6:
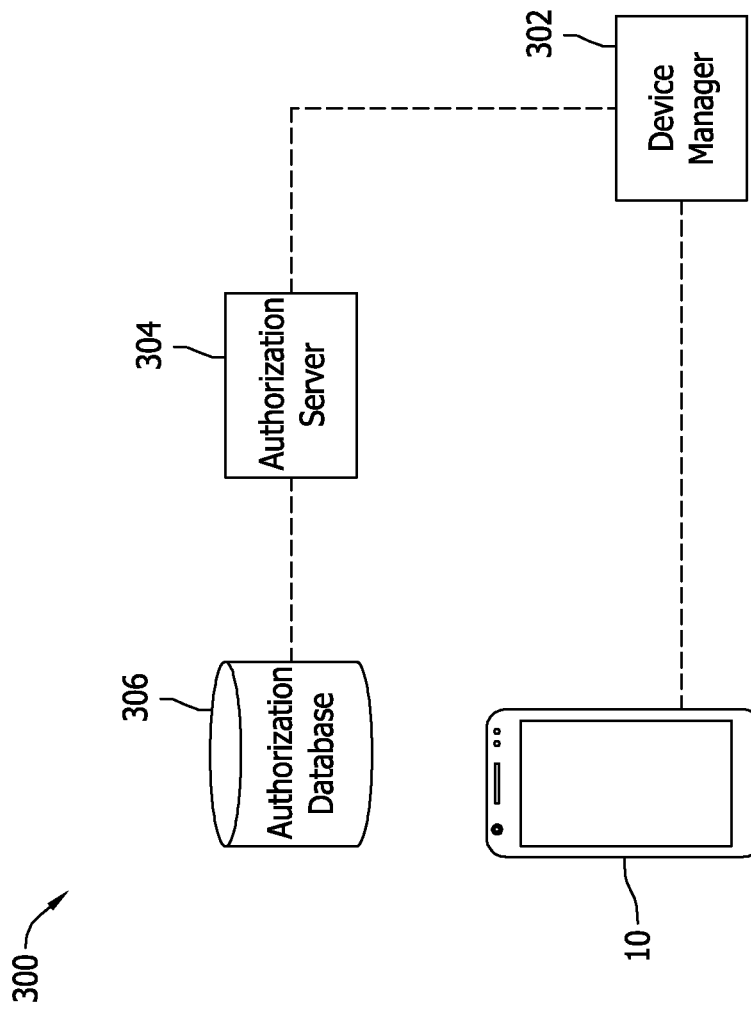
FIG. 6 is a schematic illustration of an exemplary system for use in authorizing an operation to be performed on the mobile communication device shown in FIG. 1.

FIG. 6 is a schematic illustration of an exemplary system 300 for use in authorizing an operation to be performed on mobile communication device 10. In the exemplary implementation, an entity may need to be authorized before being permitted to modify software installed on a targeted computing device, such as mobile communication device 10. For example, once a persona has been loaded onto mobile communication device 10, a device holder retains the authority to remove and/or replace that persona, but the persona owner has the authority to modify it. As such, an entity acting on behalf of the persona owner may need to be authorized as having predetermined permissions granted to it by the persona owner to modify a persona. As used herein, the term "device holder" refers to an entity that uses a default persona to operate mobile communication device 10.

An administrator computer, such as device manager (DM) 302, may generate and transmit a request to an authorization server 304 for authorization to perform an operation on mobile communication device 10. The request is a file that specifies the parameters for the operation to be performed on mobile communication device 10. Exemplary parameters include, but are not limited to, identification of a targeted computing device (e.g., mobile communication device 10), the operation to be performed on the targeted computing device, a time period in which the operation will be performed, and a geographic location of the targeted computing device. Moreover, the request is signed by a first private key of a private, public key pair assigned to an administrator. In some implementations, the request may be transmitted via a removable media (not shown).

Authorization server 304 receives the request from DM 302 and verifies the signature of DM 302 with a public key of the first private, public key pair. Authorization server 304 also determines whether parameters for the operation to be performed align with the security policy for mobile communication device 10. Authorized parameters may be stored in an authorization database 306, which is accessible by authorization server 304. Authorization server 304 then generates an authorization response if the request has been authorized. The authorization response may include the request from DM 302 and an authorization token created by authorization server 304. The authorization token may be used to authorize the requested operation. In some embodiments, the authorization token may have a predetermined authorization period in which the requested operation may be performed, may be restricted to granting authorization for a particular targeted computing device, and/or may authorize performance of a single or multiple operations on mobile communication device 10. As an example only, the authorization token may include authorization to perform the operation on a predetermined targeted computing device, and/or authorization to perform a predetermined operation on the targeted computing device. Moreover, the authorization token may be generated at least one of prior to receiving the request to perform the operation on mobile communication device 10 and in response to verification of the request to perform the operation on mobile communication device 10. The authorization response may then be signed by a second private key of a private, public key pair associated with the authorization server computer and transmitted to the administrator computer. In an alternative implementation, the authorization response may be signed by an authentication operator. For example, the request may be queued and either signed, granted, or denied by the authentication operator. In some implementations, the authorization response may be transmitted via a removable media (not shown).

DM 302 receives the authorization response and determines whether the authorization token authorizes the requested operation. For example, DM 302 may verify the authorization response with a public key of the second private, public key pair, wherein the authorization response is signed with a private key of the second private, public key pair. DM 302 then transmits the authorization response file to mobile communication device 10 to request an operation to be performed if the request has been authorized. Transmitting the authorization response may include signing the authorization response with the private key of the first private, public key pair. Mobile communication device 10 receives the authorization response and verifies the signatures with a public key of the first private, public key pair associated with the administrator computer, and determines whether the parameters specified in the authorization response align with the security policy for mobile communication device 10. Mobile communication device 10 allows the requested operation to proceed if the signatures are verified and the parameters align. The privileged operation may then be performed on mobile communication device 10. In an alternative implementation, the authorization response may include a certificate chain to an authorization root of trust. Further, in an alternative implementation, the authorization token may be generated and transmitted via sneaker-net.

Figure 7:
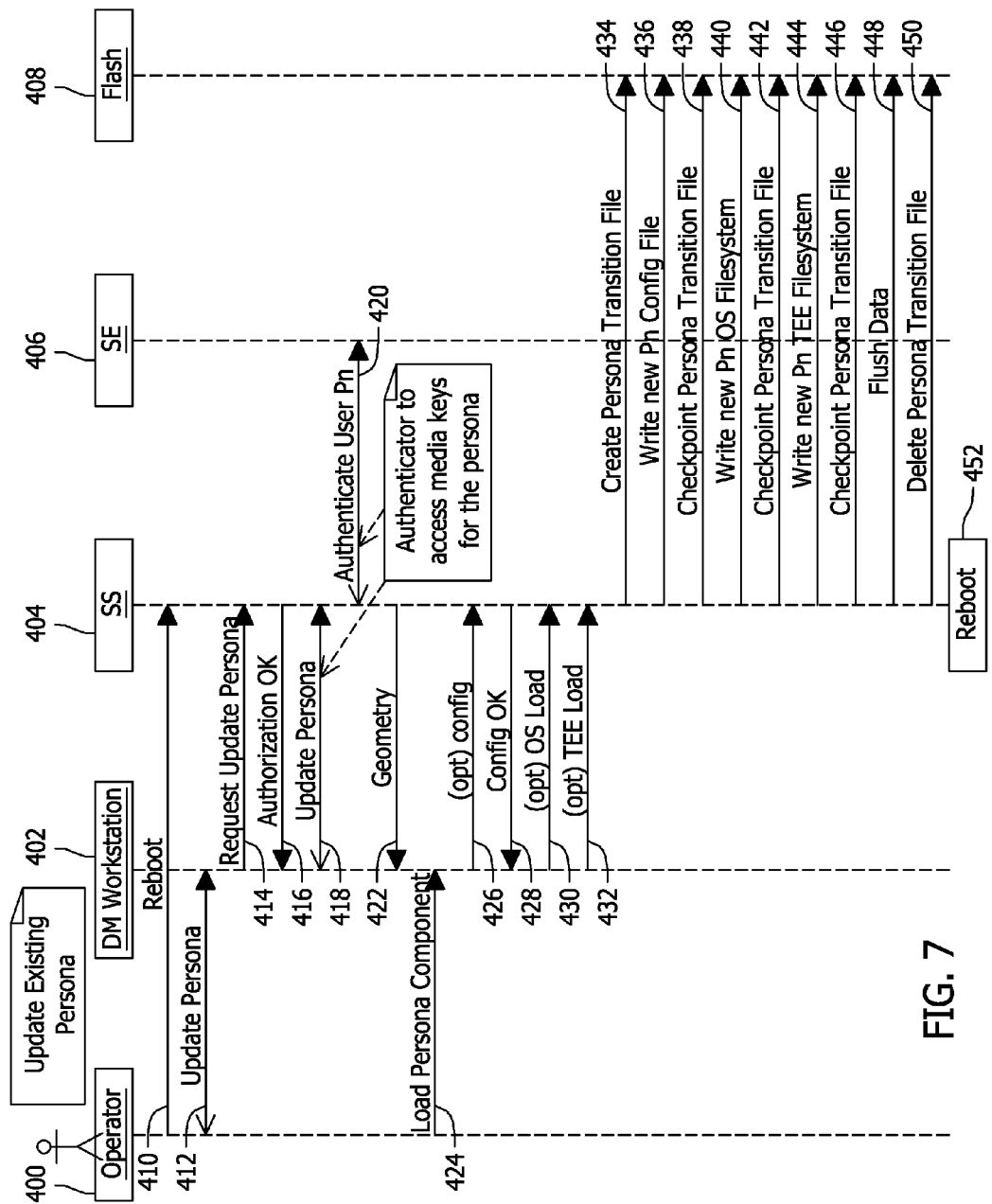
FIG. 7 is a flow diagram of an exemplary method of updating persona software that may be used with the mobile communication device shown in FIG. 1.

FIG. 7 is a flow diagram of an exemplary method of updating persona software that may be used with mobile communication device 10. In the exemplary implementation, operator 400 may update an existing persona OS, such as second persona 120, by coupling a USB cable from a Device Manager (DM) Workstation 402 to mobile communication device 10. Device management software is run and operator 400 directs mobile communication device 10 to reboot 410. During reboot 410, mobile communication device 10 detects the USB connection and enters a programming mode such that the persona operating systems do not load. Operator 400 then directs the DM software 412 to request 414 an update to a persona OS on mobile communication device 10. DM workstation 402 contacts an authorization server to obtain an authorization token. The authorization token may be cached and/or loaded from an offline source. Security supervisor 404 may then authorize 416 the request 414, and the persona update 418 may proceed. In some implementations, the DM software will alert operator 400 and refuse to perform the updating process if a valid authorization token is not present.

The DM workstation 402 includes a shared secret key that may be used to unlock secure element 406. Only storage encryption keys related to the authorized persona may be retrieved from secure element 406 using the authentication provided by the shared secret key. Mobile communication device 10 then validates the authorization token to verify that operator 400 has the privileges to perform the requested operation. The user is authenticated 420 by secure element 406, and the operation is aborted if operator 400 does not have the proper credentials.

The DM software then requests 422 device geometry data of the persona from mobile communication device 10. The device geometry data may include, but is not limited to, a size of the OS and TEE components of a persona. The software update proceeds if the persona geometry matches the device geometry, and the software update stops and an error is indicated if there is a mismatch. In an alternative implementation, the revision number of persona-owned packages may also be provided so the persona owner can verify compatibility of the update.

The DM software starts the load process by transmitting 424 the software to be updated to mobile communication device 10. In one implementation, the software update begins by transmitting 426 the configuration of the persona if it is included in the update. Security supervisor 404 then examines and evaluates the configuration file's geometry, root of trust, and signature to determine if a conflict will occur with other configuration files that are already loaded on mobile communication device 10. The software update proceeds if the configuration file is validated 428 and/or if the configuration file is not being updated, and the software update stops if there is a conflict between configuration files. Further, an updated operating system and/or a trusted execution environment may be loaded 430 and 432 onto mobile communication device 10.

The transmitted software updates are stored on flash memory 408 and validated against the trust anchor. A persona transition file is then created 434 to indicate which software is to be updated, the software is written onto flash 408, and a checkpoint is created in the transition file after each update. For example, the new configuration file is written 436 onto flash 408 and the transition file is checkpointed 438, the new persona OS filesystem is written 440 onto flash 408 and the transition file is checkpointed 442, and the new persona TEE filesystem is written 444 onto flash 408 and the transition file is checkpointed 446. In the exemplary implementation, the target flash filesystems are programmed from the memory contents stored earlier, and are encrypted during transfer using storage keys from the configuration file. After the update is complete, buffer data is flushed 448 to flash 408, the persona transition file is deleted 450, and mobile communication device 10 is rebooted 452.

Figure 8:
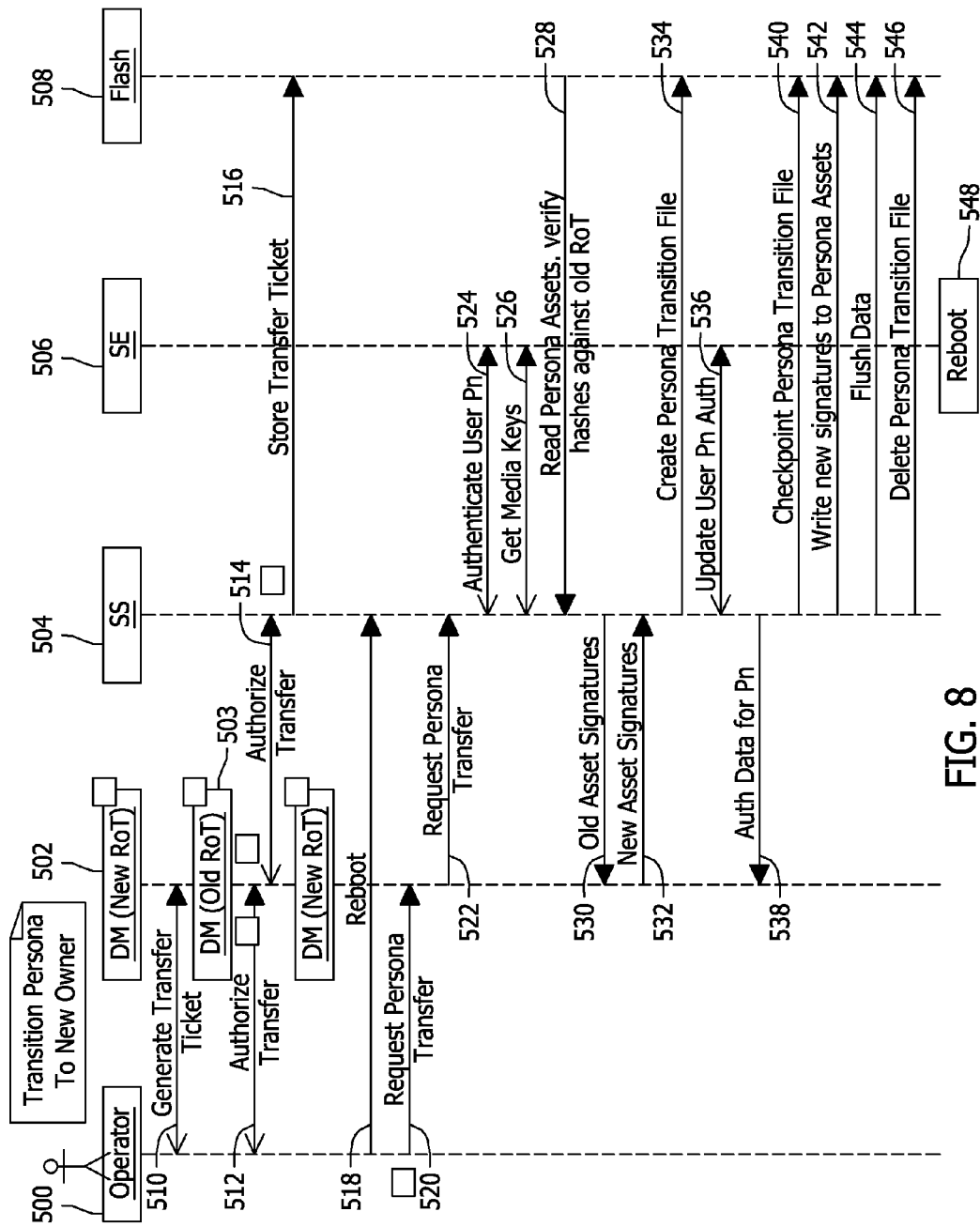
FIG. 8 is a flow diagram of an exemplary method of transitioning ownership of a persona that may be used with the mobile communication device shown in FIG. 1.

FIG. 8 is a flow diagram of an exemplary method of transitioning ownership of a persona that may be used with mobile communication device 10. Ownership of a persona loaded on mobile communication device 10 may be transitioned to a new owner without updating the persona data. In the exemplary implementation, the new owner generates 510 a transfer ticket within device manager (DM) (New RoT) 502. The transfer ticket may be a block of data that details the specific device to be transitioned and the expected current root of trust. The block of data is then sent to the current persona owner, and the current persona owner verifies the information within the current persona owner DM (New RoT) 502.

The operator 500 working on behalf of the current persona owner then obtains an authorization token indicating whether the operator and the current persona owner are authorized 512 and 514 by DM (Old RoT) 503 to transfer the persona. The authorization token is then appended to and signs the transfer ticket, and the signed transfer ticket is transferred to and stored 516 on flash 508. The signed transfer ticket may also be returned to the prospective new persona owner along with an authentication key for the persona slot within secure element 506. In such an implementation, the authentication key may be wrapped using the new persona owner's DM operator public key that is attached to the transfer ticket. The operator working on behalf of the new persona owner may then use the wrapped transfer ticket to start the transfer process. More specifically, mobile communication device 10 may verify the credentials of the new persona owner and authorize the transfer.

Operator 500 then couples a USB cable from a workstation of DM (New RoT) 502 to mobile communication device 10. Device management software is run and operator 500 directs mobile communication device 10 to reboot 518. During reboot 518, mobile communication device 10 detects the USB connection and enters a programming mode such that the persona operating systems do not load. Operator 500 then instructs the DM software to transition a persona owned by the current persona owner to the new persona owner. The transfer ticket includes information required for authorization, and a public key infrastructure (PKI) certificate of operator 500 that serves to authenticate the request signed by the root of trust for the previous owner of the transitioned persona.

The DM software uses the secret key of operator 500 to unwrap the authentication key from the transfer ticket. The authentication key may then be used 520 to request 522 persona transfer, and to authenticate 524 the operator to unlock secure element 506 on mobile communication device 10. In such an implementation, the authentication 524 only enables storage encryption keys related to the authorized persona to be retrieved from secure element 506.

The transition further includes transferring 530 the old persona asset hashes to DM 502. DM 502 verifies the signatures and resigns the hashes with the new persona signing key that is authorized to sign the relevant assets. Further, the persona key that allows access to the persona media keys is changed, and the new value is transferred to DM 502. Replacement signatures are then transferred 532 from DM 502 to mobile communication device 10, and mobile communication device 10 validates the signatures and replaces the old signatures on the persona assets with the new signatures.

A persona transition file is then created 534, and the configuration file for the persona is checked for validity and conflicts with other configuration files that are already loaded on mobile communication device 10. The process proceeds if the configuration file is validated, and the software update stops if there is a conflict between configuration files. The user persona authentication is updated 536 upon authorization to proceed such that media keys may be accessed by the new root of trust and returned 538 to DM 502.

DM 502 signs the assets that are being updated and returns the signed hashes. For example, assets that are being updated may either have signatures that are updated with re-signed hashes and/or may be updated 542 with new signatures. The persona transition file is checkpointed 540 after each update to enable the process to be restarted from an interrupted update. After the update is complete, buffer data is flushed 544 to flash 508, the persona transition file is deleted 546, and mobile communication device 10 is rebooted 548.

After persona ownership has been transferred to the new persona owner, a new trust relationship may need to be established between the transitioned persona and any personas that had a trust relationship with the previous persona owner. More specifically, the persona configuration of the other personas running on mobile communication device 10 may have to be updated to establish a trust relationship with the new persona owner to maintain the same functionality as with the previous persona owner.

Figure 9:
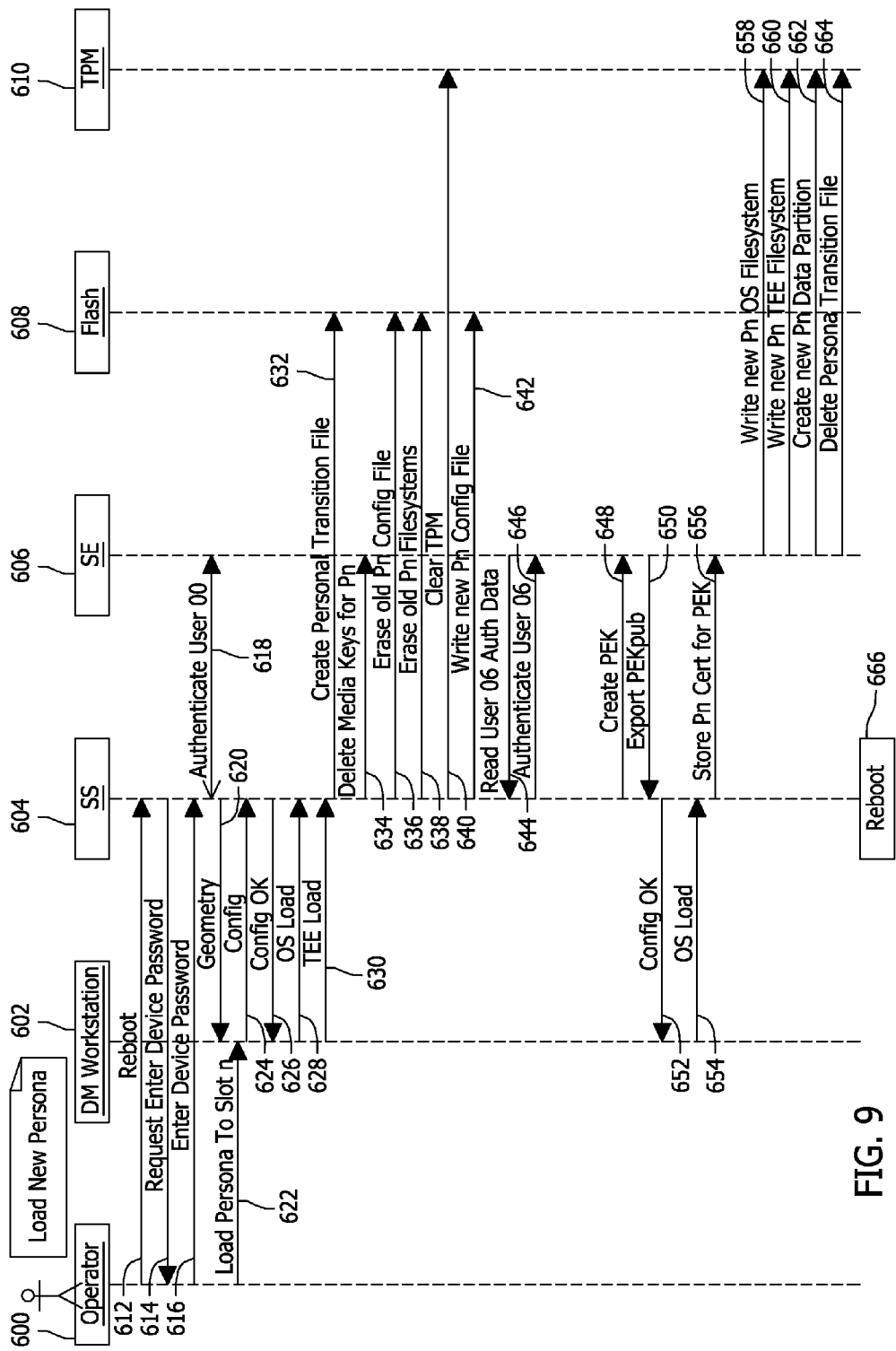
FIG. 9 is a flow diagram of an exemplary method of loading a new persona that may be used with the mobile communication device shown in FIG. 1.

FIG. 9 is a flow diagram of an exemplary method of loading a new persona that may be used with mobile communication device 10. In the exemplary implementation, operator 600 couples a USB cable from a Device Manager (DM) Workstation 602 to mobile communication device 10. Device management software is run and operator 600 directs mobile communication device 10 to reboot 612. During reboot 612, mobile communication device 10 detects the USB connection and enters a programming mode such that the persona operating systems do not load. Operator 600 is then prompted 614 to authorize the USB connection with a device password held by the device owner, and the device password is entered 616 and authenticated 618 to unlock secure element 606. In an alternative implementation, mobile communication device 10 may be reinitialized and reset to a factory configuration.

The DM software then requests 620 device geometry data of the persona from mobile communication device 10, and operator 600 directs DM Workstation 602 to load 622 the persona package into a specific persona slot. The device geometry data may include, but is not limited to, a size of the OS and TEE components of a persona. The software update proceeds if the persona geometry matches the device geometry, and the software update stops and an error is indicated if there is a mismatch. In an alternative implementation, the revision number of persona-owned packages may also be provided so the persona owner can verify compatibility of the update.

The DM software starts the load process by transmitting the software to be loaded onto mobile communication device 10. In one implementation, the software load begins by transmitting 624 the configuration file of the persona to mobile communication device 10. Security supervisor 604 then examines and evaluates the configuration file's geometry, root of trust, and signature to determine if a conflict will occur with other configuration files that are already loaded on mobile communication device 10. The software load proceeds if the configuration file is validated 626, and the software load stops if there is a conflict between configuration files. In some implementations, a new persona OS and a new TEE are loaded 628 and 630 onto mobile communication device 10.

The transmitted software is stored on flash memory 608 and validated against the trust anchor. A persona transition file is then created 632 and written to indicate overwrite. The overwrite indication is a sentinel value written in a persistent manner such that appropriate recovery measures may be taken to recover from failure if the update process is interrupted. More specifically, storage media keys in secure element 606 for the persona are deleted 634, the old persona configuration file is erased 636, the persona flash filesystems are erased 638, and trusted platform module (TPM) 610 is forcecleared 640.

The new persona may then be loaded onto mobile communication device 10 in a persistent manner. More specifically, the new configuration file is written 642 onto flash 608, user authentication data is read 644 by security supervisor 604, and the user is authenticated 646 to unlock secure element 606. A public encryption key (PEK) of a private, public key pair may then be created 648 and exported 650 to the persona owner from secure element 606. The persona owner signs the PEK with its certificate authority and the software load 654 proceeds if the configuration file is validated 652. The PEK is then returned to and stored 656 in secure element 606.

The secret key of the PEK private, public key pair is stored and protected within secure element 606 such that it will not be exported from secure element 606. This enables a persona owner to verify, by the response signed by the private key, that a request to perform a service came from an authorized device. The PEK may be created at the time persona ownership is defined and may be used to authenticate a software update, request, and/or package, for example. In an alternative implementation, a second private, public key pair may be created and used for encryption such that a persona owner can encrypt data targeting a specific device and such that other devices would not be able to decrypt the data.

The new persona OS filesystem is then written 658 onto flash 608, the new persona TEE filesystem is written 660 onto flash 608, and a new persona data partition is created 662. The target flash filesystems are programmed from the memory contents stored earlier, and are encrypted during transfer using storage keys from the configuration file. After the update is complete, the persona transition file is deleted 664 and mobile communication device 10 is rebooted 666.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mobile communication device comprising:
   a first trusted platform module;
   a second trusted platform module;
   a processor; and
   a non-transitory storage medium comprising instructions that cause said processor to:
   establish a first root of trust for a first persona, the first persona comprising a first operating system and a first trusted execution environment;
   establish a second root of trust for a second persona, the second persona comprising a second operating system and a second trusted execution environment, wherein the first root of trust is separate from the second root of trust;
   store measurements defining the first root of trust for the first persona in the first trusted platform module;
   store measurements defining the second root of trust for the second persona in the second trusted platform module; and
   load the first persona and the second persona using the roots of trust for the first and second personas, wherein the first persona can access components of the mobile communication device according to the first root of trust and the second persona can access components of the mobile communication device according to the second root of trust.

2. The device in accordance with claim 1, wherein said storage medium further comprises instructions that cause said processor to establish mutual trust between the first trusted execution environment and the second trusted execution environment such that the first persona is coupled in communication with the second persona.

3. The device in accordance with claim 2 further comprising a high assurance guard that facilitates restricting transfer of data between the first persona and the second persona when the first persona is coupled in communication with the second persona.

4. The device in accordance with claim 1, wherein said storage medium further comprises instructions that cause said processor to transfer control of the first trusted platform module to the first persona and transfer control of the second trusted platform module to the second persona after the first and second personas have been loaded.

5. The device in accordance with claim 4, wherein the first trusted execution environment has exclusive access to the first trusted platform module and the second trusted execution environment has exclusive access to the second trusted platform module.

6. The device in accordance with claim 1, wherein said storage medium further comprises instructions that cause said processor to validate an image of the first operating system and the second operating system against the associated roots of trust for the first persona and the second persona during loading.

7. The device in accordance with claim 1, wherein said storage medium further comprises instructions that cause said processor execute the first persona and the second persona in contexts that are isolated from each other.

8. A method of operating a mobile communication device, said method comprising:
   establishing a first root of trust for a first persona, the first persona including a first operating system and a first trusted execution environment;
   establishing a second root of trust for a second persona, the second persona including a second operating system and a second trusted execution environment, wherein the first root of trust is separate from the second root of trust;
   storing measurements defining the first root of trust for the first persona in a first trusted platform module;
   storing measurements defining the second root of trust for the second persona in a second trusted platform module; and loading the first persona and the second persona using the roots of trust for the first and second personas, wherein the first persona can access components of the mobile communication device according to the first root of trust and the second persona can access components of the mobile communication device according to the second root of trust.

9. The method in accordance with claim 8 further comprising establishing mutual trust between the first trusted execution environment and the second trusted execution environment such that the first persona is coupled in communication with the second persona.

10. The method in accordance with claim 8, wherein loading the first persona and the second persona comprises loading an underlying operating system with a boot loader signed by a device manufacturer root of trust.

11. The method in accordance with claim 8, wherein establishing the roots of trust for the first and second personas comprises validating an image of the first operating system and the second operating system against the roots of trust for the first and second personas during loading.

12. The method in accordance with claim 8 further comprising transferring control of the first trusted platform module to the first persona and transferring control of the second trusted platform module to the second persona after the first and second personas have been loaded.

13. The method in accordance with claim 8, wherein establishing a root of trust for the first and second personas comprises:
measuring software components used to establish the first and second persona roots of trust; and
extending the measurements into the first and second trusted platform modules, wherein the measurements for the first trust anchor extend into the first trusted platform module and the measurements for the second trust anchor extend into the second trusted platform module.

14. The method in accordance with claim 8 further comprising:
defining a security policy for the first persona and the second persona, wherein the security policies define how the first persona and the second persona access physical devices on the mobile communication device; and
enforcing the security policies with a security supervisor.

15. The method in accordance with claim 14, wherein enforcing the security policies comprises at least one of:
enabling exclusive access for one of the first persona and the second persona to at least one of the physical devices;
enabling shared access between the first persona and the second persona to at least one of the physical devices; and
denying access of at least one of the physical devices to one of the first persona and the second persona.

16. A non-transitory computer readable medium storing computer-executable instructions thereon for operating a mobile communication device that includes a processor, a first trusted platform module, and a second trusted platform module, the computer-executable instructions cause the processor to:
establish a first root of trust for a first persona, the first persona including a first operating system and a first trusted execution environment;
establish a second root of trust for a second persona, the second persona including a second operating system and a second trusted execution environment, wherein the first root of trust is separate from the second root of trust;
store measurements defining the root of trust for the first persona in the first trusted platform module;
store measurements defining the second root of trust for the second persona in the second trusted platform module; and
load the first persona and the second persona using the roots of trust for the first and second personas, wherein the first persona can access components of the mobile communication device according to the first root of trust and the second persona can access components of the mobile communication device according to the second root of trust.

17. The non-transitory computer readable medium in accordance with claim 16 further comprising computer-executable instructions that cause the processor to:
establish mutual trust between the first trusted execution environment and the second trusted execution environment such that the first persona is coupled in communication with the second persona.

18. The non-transitory computer readable medium in accordance with claim 16 further comprising computer-executable instructions that cause the processor to:
load an underlying operating system with a boot loader signed by a device manufacturer root of trust.

19. The non-transitory computer readable medium in accordance with claim 16 further comprising computer-executable instructions that cause the processor to:
transfer control of the first trusted platform module to the first persona and transfer control of the second trusted platform module to the second persona after the first and second personas have been loaded.

20. The non-transitory computer readable medium in accordance with claim 16 further comprising computer-executable instructions that cause the processor to:
define a security policy for the first persona and the second persona, wherein the security policies define how the first persona and the second persona access physical devices on the mobile communication device; and
enforce the security policies with a security supervisor.

* * * * *